United States Patent [19]

Kawaguchi et al.

[11] Patent Number: 5,310,196
[45] Date of Patent: May 10, 1994

[54] METALLIC GASKET AND METHOD OF MANUFACTURING THE SAME

[75] Inventors: Shigeru Kawaguchi; Kenji Kubouchi; Hiroshi Uemura; Kunitoshi Inoue, all of Osaka, Japan

[73] Assignee: Nippon Gasket Co., Ltd., Osaka, Japan

[21] Appl. No.: 932,188

[22] Filed: Aug. 20, 1992

[30] Foreign Application Priority Data

Aug. 21, 1991 [JP] Japan .................................. 3-232450

[51] Int. Cl.$^5$ .............................................. F16J 15/08
[52] U.S. Cl. ................................ 277/180; 277/235 B
[58] Field of Search ....................... 277/235 B, 236, 180

[56] References Cited

U.S. PATENT DOCUMENTS

| 3,053,544 | 9/1992 | Gorsica. | |
| 4,688,809 | 8/1987 | Deppe | 277/180 X |
| 4,836,562 | 6/1989 | Yoshino | 277/235 B |
| 5,092,613 | 3/1992 | Udagawa | 277/235 B |
| 5,213,345 | 5/1993 | Udagawa | 277/180 X |
| 5,240,261 | 8/1993 | Udagawa et al. | 277/234 X |

FOREIGN PATENT DOCUMENTS

| 0406730 | 1/1991 | European Pat. Off. | 277/235 B |
| 0486255 | 4/1992 | European Pat. Off. | |
| 0485693 | 5/1992 | European Pat. Off. | 277/235 B |
| 2849018 | 5/1980 | Fed. Rep. of Germany | 277/235 B |
| 0255253 | 12/1986 | Japan | 277/235 B |
| 0214570 | 9/1988 | Japan | 277/236 |
| 0214571 | 9/1988 | Japan | 277/236 |
| 4181070 | 6/1992 | Japan. | |

Primary Examiner—William A. Cuchlinski, Jr.
Assistant Examiner—Scott W. Cummings
Attorney, Agent, or Firm—Browdy and Neimark

[57] ABSTRACT

At the portions of the metallic gasket according to the present invention which are around perforations the inner diameter of which is smaller than that of holes for combustion chamber, the thickness of at least the folded portions and the portions of an elastic metallic plate on which these folded portions are laminated are reduced to a level in the range from a level not higher than that of the thickness of said metallic plate to a level not lower than that of a half of the thickness of said metallic plate. These thickness-reduced portions of the metallic plate are bent onto the bead-ridge-carrying side thereof to form folded portions, whereby the thickness of the folded portions is reduced to provide a difference in height between the folded portions and the bead-surrounding portions of the metallic plate. The metallic plate is heat treated after the folding step has been completed, to regulate the hardness of the metallic plate.

3 Claims, 3 Drawing Sheets

METALLIC GASKET AND METHOD OF MANUFACTURING THE SAME

BACKGROUND OF THE INVENTION

1. Field of the Invention

This invention relates to a metallic gasket used to seal the joint surfaces of a cylinder head and a cylinder block of a multicylinder engine, and a method of manufacturing the same.

2. Description of the Prior Art

A metallic gasket formed out of a metallic material has been used to seal the opposed joint surfaces of a cylinder head and a cylinder block of an engine. In a recent engine, the increasing of the output level and the decreasing of the weight have been demanded. In order to meet these requirements, a cylinder head and a cylinder block tend to be formed out of an aluminum material having a low specific gravity instead of steel or a cast metal having a high specific gravity which has heretofore been used. An aluminum material has a small weight but the rigidity thereof is low. Therefore, while an engine in which the cylinder head and cylinder block are formed out of an aluminum material is operated, the relative displacement of the cylinder head with respect to the cylinder block tends to increase. A metallic gasket has beads near the circumferences of the through holes therein which correspond to the cylinder bores and passages for water and oil in these structural members of an engine. When the cylinder head and cylinder block are fixed to each other by tightening the same with bolts, these beads form annular resilient contact members with respect to the opposed joint surfaces of the cylinder head and cylinder block and seal the same joint surfaces.

The applicant of this invention has filed a patent application (Japanese Patent Application No. 306295/1990) concerning a single-plate metallic gasket to be disposed between the opposed joint surfaces of a cylinder head and a cylinder block of an engine and then tightened therewith, and a method of manufacturing the same. This metallic gasket has holes for combustion chamber formed in an elastic metallic plate, beads formed on the portions of the elastic metallic plate which are spaced radially outward from the circumferences of these holes, so as to extend along the same holes, and folded portions formed by bending the portions of the metallic plate which are around the holes, in the radially outward direction thereof onto the surface of the metallic plate on which the projecting surfaces of the beads extend, the folded portions being set to a predetermined thickness and heat treated. Accordingly, when the metallic gasket is tightened and pressed between the opposed joint surfaces of a cylinder head and a cylinder block, the beads form annular seals against these joint surfaces, and the folded portions the thickness of which is two times as large as that of the metallic plate form another seals extending around the holes. Thus, the beads and folded portions eliminate the irregularity of the opposed joint surfaces, minimize the flexure, which occurs due to the repetition of a combustion cycle, of the cylinder head, reduce fluctuating load stress and prevent the full compression of the beads.

The metallic gaskets disclosed in this publication include a metallic gasket in which a metallic plate the thickness of which is smaller than that of the elastic metallic base plate is laminated on the portions of the bead-ridge-carrying side of the base plate which are other than the portions thereof extending between adjacent holes, and which extend in the radially outward direction of the beads, so as to regulate a difference in thickness between the folded portions and the regions of the base plate which are on the radially outer side of the beads; a metallic gasket in which each of such folded portions is formed with a soft metallic plate held in a sandwiched state therein so that the difference in thickness referred to above does not become larger than a required one; a metallic gasket in which such folded portions are formed to a larger thickness on the regions between adjacent holes, and to a smaller thickness on the remaining regions so as to obtain a large pressing force on the former regions which demand high sealing performance; and a metallic gasket both surfaces of which are coated with a non-metallic gasket both surfaces of which are coated with a non-metallic material, such as heat and oil resisting rubber or resin so as to avoid the direct metal-to-metal contact between the gasket and the opposed joint surfaces of a cylinder head and a cylinder block, prevent the metallic surfaces from being corroded or soiled, and secure the excellent sealing function of the gasket even when the opposed joint surfaces of these parts of an engine are uneven.

The metallic gasket manufacturing method disclosed in the above-mentioned publication consists of the steps of forming holes for combustion chamber in an elastic metallic plate, molding beads on the portions of this metallic plate which are around and spaced radially outward from the circumferences of these holes so that the beads extend along the same circumferences, bending the portions of the metallic plate which are around the holes in the radially outward direction thereof onto the bead-ridge-carrying side of the metallic plate to form folded portions the edges of which are aligned with those of the holes, applying a compressive force to the folded portions so that the folded portions are formed to a predetermined thickness, and heat treating the metallic plate on which the folded portions have been formed so as to regulate the hardness of the plate. A metallic gasket manufacturing method identical with this method to which a step of inserting soft metallic plates in a sandwiched manner in the folded portions is added is also disclosed.

The applicant of the present invention has further filed a patent application (Japanese Patent Application No. 156189/1991), which is other than the above-mentioned prior-filed application, concerning a metallic gasket to be disposed and tightened between the opposed joint surfaces of a cylinder head and a cylinder block. This metallic gasket has holes for combustion chamber which are formed in an elastic metallic plate, beads formed on the portions of the metallic plate which are spaced from the circumferences of the holes in the radially outward direction thereof so as to extend along the same circumferences, and folded portions formed by bending the portions of the metallic plate which are around the holes in the radially outward direction onto the bead-ridge-carrying side of the metallic plate, in which gasket a regulating plate is laminated on the bead-ridge-carrying side of the metallic plate so as to extend in the radial direction of the beads, whereby the strength of the metallic plate is regulated.

In general, a metallic gasket consisting of a single elastic metallic plate employs an elastic metallic plate of 0.25 mm in thickness. When such an elastic metallic plate is bent at the portions thereof which are around the holes for combustion chamber to form folded portions, a difference in thickness corresponding to the thickness of the plate occurs between the portions thereof which are around the holes and the portions thereof which are on the radially outer side of the mentioned portions. It is considered that a desirable level of this difference is around 0.10–0.17 mm, though it depends upon the height of the beads. When this difference is too large, the portions of an elastic metallic plate which have such a difference in thickness are unduly deformed during a metallic gasket tightening operation carried out between the opposed joint surfaces of a cylinder head and a cylinder block. Since the portions thus deformed of the elastic metallic plate are bent, they necessarily become disadvantageous to resist stress, and further excessive stress would occur in these portions due to variation of load corresponding to a combustion cycle of the engine, to cause cracks to occur therein. The bead-carrying portions of such an elastic metallic plate serve as seals. When a metallic gasket having folded portions of a large thickness is tightened, strong seals are formed to prevent a high-temperature corrosive combustion gas from leaking from the holes for combustion chamber. Therefore, a load is applied one-sidedly to the folded portions around the holes, i.e., the requirements for excellent sealing performance are more concentrated on the folded portions than on the beads. Consequently, when the folded portions are broken while the gasket is used for a long period of time, the combustion gas leakage-preventing function thereof is not effectively fulfilled since the sealing force of the beads, which are provided so as to form two-stage seals with the folded portions, is not so large.

When a difference in thickness between the folded portion-carrying parts of the elastic metallic plate of this gasket is higher than a desired level, a plate thickness regulating plate is laminated on the elastic metallic plate so as to reduce the height of the folded portions. In such a thickness regulating method, it is necessary to provide regulating plates separately, so that the metallic gasket manufacturing cost increases. Moreover, in order to make regulating plates, it is necessary that the shape of the regulating plates be in agreement with that of the beads on the elastic metallic plate, and that the equipment for carrying out the laminating a regulating plate on the elastic metallic plate be provided. Therefore, this height difference regulating method is economically disadvantageous.

In the production of a metallic gasket having folded portions, the elastic metallic plate is subjected in some cases to so-called precompression in which the whole of the folded portions is compressed uniformly or a part thereof is compressed so as to set the thickness and width of different parts of the folded portions corresponding to different circumferential positions of the holes to different levels after the folded portions have been formed and before the gasket has been tightened between a cylinder head and a cylinder block. In such a method, the thickness of the plate is reduced after the folded portions have been formed, so that sudden and large variation in terms of engineering of materials occurs at the folded ends thereof. This would cause cracks to occur in the folded ends, or cracks to occur in the hole-side edges of the folded portions when the gasket is used for a long period of time with potential causes of cracks still retained therein.

SUMMARY OF THE INVENTION

An object of the present invention is to solve these problems, and provide a high-quality metallic gasket capable of being obtained at a low price by carrying out a simple additional step for the formation of folded portions, i.e., by reducing the thickness of predetermined parts, on which folded portions are to be formed, of an elastic metallic plate before the circumferential edges of perforations have been folded so as to form holes, whereby the thickness of the folded portions is reduced to provide desired stepped portions on the metallic plate.

In this metallic gasket, the folded portions of a bead-carrying elastic metallic plate, and the portions of the metallic plate on which the folded portions are laminated are formed to a thickness between the thickness of the metallic plate and a half of the same, and this metallic plate is heat treated after the folded portions have been formed. Therefore, when the metallic gasket is tightened and compressed between two structural members having opposed joint surfaces, i.e. a cylinder head and a cylinder block, the beads provided on the portions of the metallic plate which are close to the circumferentces of the holes for combustion chamber are deformed due to the pressing force to form annular seals on the portions of the metallic plate which are spaced from these holes in the radially outward direction thereof against these opposed joint surfaces. Since the thickness of the folded portions is reduced to a level substantially not less than a half that of the elastic metallic plate, a total thickness of each folded portion and the portion of the metallic plate on which this folded portion is laminated by a bending process becomes not less than the thickness of the same metallic plate, so that these folded portions form another set of annular seals around the holes for combustion chamber.

Accordingly, when the metallic gasket is tightened between a cylinder head and a cylinder block, two-stage seals are formed. Therefore, even when irregularity occurs on the opposed joint surfaces, the beads and folded portions are deformed in accordance with the flexure of the metallic plate to eliminate the irregular clearance between the two opposed joint surfaces. Owing to the synergetic effect of the provision of the two-stage annular seals and the elimination of the irregularity of the opposed joint surfaces, these seals jointly support a fluctuating load, which occurs due to the repetition of a combustion cycle of the engine, and a thermal load, so that the rate of flexure of the cylinder head can be minimized.

According to this metallic gasket, the thickness of at least the folded portions and the portions of the elastic metallic plate on which the folded portions are laminated are reduced to not less than a half of the thickness of the metallic plate. Accordingly, it follows that a total thickness of each folded portion and the portion of the metallic plate on which the folded portion is laminated becomes not less than the thickness of the metallic plate but less than two times the thickness of the same plate. The thickness of the folded portions can be set to an arbitrary level within the above-mentioned range in accordance with the desired degree of reduction of the thickness thereof. Consequently, a difference in thickness between the folded portions of a metallic gasket and the portions of the elastic metallic plate which are other than the folded portions does not become too large, and such stepped regions of the metallic plate are not unduly deformed when the gasket is tightened between the opposed joint surfaces of a cylinder head and a cylinder block. Although the elastic metallic plate originally has a low resistance to stress occurring when it is bent, there is not the possibility of occurrence of cracks in the metallic plate even when a fluctuating load due to a combustion cycle of the engine works additionally thereon.

In this metallic gasket, beads are formed on the portions of the elastic metallic plate which are spaced from the circumferences of the holes therein in the radially outward direction, so as to extend along the holes, and folded portions on the portions of the metallic plate which are between the circumferential portions of the holes and the beads by bending the metallic plate in the radially outward direction of the holes. When only the folded portions are formed on the metallic gasket, a difference in thickness corresponding to the thickness of the elastic metallic plate occurs between the folded portions and the portions of the metallic plate which are on the radially outer side of the beads. When this difference is larger than a required amount, inconveniences occur. However, in this metallic gasket, the thicknesses of at least the folded portions and the portions of the elastic metallic plate on which the folded portions are laminated are reduced to not less than a half of the thickness of the metallic plate. Accordingly, it follows that a total thickness of each folded portion and the portion of the metallic plate on which the folded portion is laminated becomes not less than the thickness of the metallic plate but less than two times the thickness of the same plate. The thickness of the folded portions can be set to an arbitrary level within the above-mentioned range in accordance with the desired degree of reduction of the thickness thereof.

Furthermore, this metallic gasket is coated at the outer surface thereof with a non-metallic material, such as heat and oil resisting rubber or resin, so that the direct metal-to-metal contact of the gasket with a cylinder head and a cylinder block can be avoided. This enables the resistance to a corrosive combustion gas, durability and accuracy of the metallic gasket to be secured, prevents the metallic surfaces from being corroded and soiled, and enables the unevenness of the surfaces (machined surfaces) of the cylinder head, cylinder block and metallic gasket to be eliminated, and a satisfactory sealing function of the gasket to be secured.

When this metallic gasket, in which the folded portions are formed to a larger thickness at the parts thereof which are between adjacent holes, and to a smaller thickness at the remaining portions, is applied to an engine in which a cylinder head having a low rigidity as compared with a cylinder block is provided with a plurality of holes, the flexure which is liable to occur most greatly in the portions of the metallic plate which are between adjacent cylinder bores due to the bend of the cylinder head during a gasket tightening operation is offset effectively by the parts of the folded portions which are between the holes, and which have larger thickness. This prevents the sealing effect of the gasket from lowering, and a high-temperature and high-pressure combustion gas which causes the beads of the metallic gasket to be corroded and soiled from entering the gasket. The folded portions effectively deal with the flexure and deformation of the portions of the cylinder head which are between the adjacent holes to enable the sealing performance of the gasket in these regions to be effectively retained. Since the range of the folded portions can be set arbitrarily as long as these portions do not overlap the beads on the base plate, the distribution of face-to-face pressure of the beads and folded portions can be regulated in the design stage.

Between the folded portions and the portions of the metallic gasket which are on the radially outer side of the folded portions, the thickness-reduced parts of the folded portions function as means for making regulations so as to obtain a required difference in thickness between these portions. The joint surfaces positioned between a cylinder block and a cylinder head are liable to become irregular due to a decrease in the rigidity thereof when these structural members are tightened but the full compression of the beads on the gasket is prevented, i.e., the beads remain uncompressed as high as the thickness of the folded portions. A required difference in thickness between the folded portions and bead-surrounding portions can be obtained easily by regulating the degree of reduction of the thickness of the above-mentioned parts of the folded portions. In the case where this difference in thickness is set to a proper level, the amount of flexure, which occurs as a result of starting, rotation and stopping of the engine, of the cylinder head is minimized, and fluctuating load stress occurring on the basis of this flexure can also be lessened. This serves to prevent the occurrence of the permanent set in fatigue of the beads and cracks in the seals, and improve the durability of the beads and seals.

The folded portions form seals during a gasket tightening operation to prevent a high-temperature corrosive combustion gas from leaking from the holes, and the bead-carrying portions of the gasket also serve as seals during this time. Since the thickness of the folded portions of this metallic gasket has been reduced, the undue sharing of a sealing force, i.e. a tightening force by the folded portions can be avoided without using any other structural members. Accordingly, it is possible to make the beads as well take shares in generating a tightening force. Even if the folded portions should be broken while the gasket is used for a long period of time, the beads which form two-stage seals with the folded portions can effectively prevent the leakage of a combustion gas.

The metallic gasket manufacturing method according to the present invention has the steps of forming annular regions of an elastic metallic plate, which extend from the circumferences of the holes for combustion chamber in the radially outward direction, to a predetermined thickness in the range of a level not higher than that of the thickness of the elastic metallic plate to a level not lower than that of a half of the thickness of the same plate, bending the resultant annular portions in the radially outward direction thereof onto the bead-ridge-carrying side of the metallic plate to form folded portions having holes defined by the bent edge portions thereof, and heat treating the metallic plate on which the folded portions have been formed, so as to regulate the hardness of the plate. Namely, an operation for reducing the thickness of the regions, at which the folded portions are to be formed, of the metallic plate is carried out before the formation of folded portions. Therefore, folded portions having a required thickness are obtained at the time of completion of the metallic plate bending step. Since the heat treatment for the elastic metallic plate is carried out after the completion of these thickness reducing and plate bending steps, the hardness of the metallic plate can be regulated freely to a desired level.

When a step of applying a compressive force to the folded portions so as to finely change the thickness thereof to a predetermined level is added to this metallic gasket manufacturing method so that this step is carried out after the step of forming the folded portions, it becomes possible to complete the greater part of the formation of folded portions by carrying out a plate bending step, and then regulate finely and freely as necesasry the thickness and width of the folded portions to final object levels. Namely, it is possible not only to set the thickness of the folded portions to a uniform level in both the circumferential direction of the holes and widthwise direction thereof but also to finely regulate the thickness of certain parts of the folded portions formed around the holes. For example, it is possible to set the thickness of the parts of the folded portions which extend in the regions in which the distance between adjacent holes is small to a high level taking the flexure of the cylinder head into consideration, and to a gradually decreasing or constantly low level at the parts of the folded portions which extend from the positions in which the distance between adjacent holes is small to positions distant therefrom.

In another mode of this metallic gasket manufacturing method, the steps of boring a soft metallic plate as a raw material, reducing the thickness of predetermined portions of the metallic plate, forming beads on the metallic plate, bending predetermined portions of the metallic plate, and finally subjecting the metallic plate to a heat treatment are carried out. Namely, this metallic gasket manufacturing method has the steps of reducing the thickness of the annular regions, which extend from the circumferences of the holes for combustion chamber formed in an elastic metallic plate to the radially outer side thereof, to a predetermined level of not higher than the level of the thickness of this metallic plate to a level not lower than a half of the same thickness, forming beads on the regions of the metallic plate which are spaced from the circumferential edges of the holes in the radially outward direction so that the beads extend along these holes, bending the bead-surrounding portions of the metallic plate in the radially outward direction onto the bead-ridge-carrying side of the metallic plate so as to form folded portions the bent edges of which define the holes of a predetermined diameter, and heat treating the metallic plate on which the folded portions have been formed, so as to regulate the hardness thereof. Therefore, it becomes possible to form simply the folded portions so that they have a difference in height with respect to the metallic base plate, and manufacture a metallic gasket of an excellent quality at a low cost.

In this metallic gasket manufacturing method, an operation to reduce an excessively large difference in height between the elastic metallic plate and the folded portions thereof is not regulated by laminating a thickness regulating plate on the base plate. Therefore, it is unnecessary to additionally provide a regulating plate the shape of which is in agreement with that of the bead-carrying portion of the elastic metallic plate, carry out the step of laminating a regulating plate on the metallic base plate, and provide additional equipment for carrying out the regulating plate laminating step, and only a small number of steps may be added to the step of boring the elastic metallic plate. This prevents the manufacturing cost from greatly increasing, and enables a metallic gasket to be economically manufactured.

According to this metallic gasket manufacturing method, which is different from a method in which an elastic metallic plate is subjected to so-called precompression wherein the whole of the folded portions is compressed uniformly or a part thereof is compressed so as to set the thickness and width of different parts of the folded portions corresponding to different circumferential positions of the holes to different levels after the folded portions have been formed and before the gasket has been tightened between a cylinder head and a cylinder block, the thickness of the elastic metallic plate is reduced not after a plate folding operation has been carried out, i.e., the reduction of the thickness of the metallic plate is done to a substantially full extent or to a full extent before a plate folding operation has been carried out. Accordingly, sudden and large variations concerning the engineering of materials do not occur in the end sections of the folded portions. Cracks do not occur in these end sections, and these end sections do not come to have causes of cracks. Even when the gasket is used for a long period of time, there is not the possibility of occurrence of cracks at the hole-defining edges of the folded portions.

In this metallic gasket manufacturing method of the mode in which a compressive force is applied to the folded portions after the step of forming the folded portions has been carried out, to finely regulate these portions to a present thickness, the formation of the folded portions has already substantially been completed by the bending operation. Therefore, the thickness and width of the folded portions can be regulated finely and freely as necessary to final object levels. Namely, it is possible not only to set the thickness of the folded portions to a uniform level in both the circumferential direction of the holes and widthwise direction thereof but also to finely regulate the thickness of certain parts of the folded portions formed around even the same holes, to a level within such a range that does not cause excessively large variation of stress to occur in the edges of the folded portions. For example, it is possible to set the thickness of the parts of the folded portions which extend in the regions in which the distance between adjacent holes is small to a high level taking the flexure of the cylinder head into consideration, and to a gradually decreasing or constantly low level at the parts of the folded portions which extend from the positions in which the distance between adjacent holes is small to positions distant therefrom.

DESCRIPTION OF THE PREFERRED EMBODIMENT

An embodiment of the metallic gasket according to the present invention will now be described with reference to the drawings.

Figure 1:
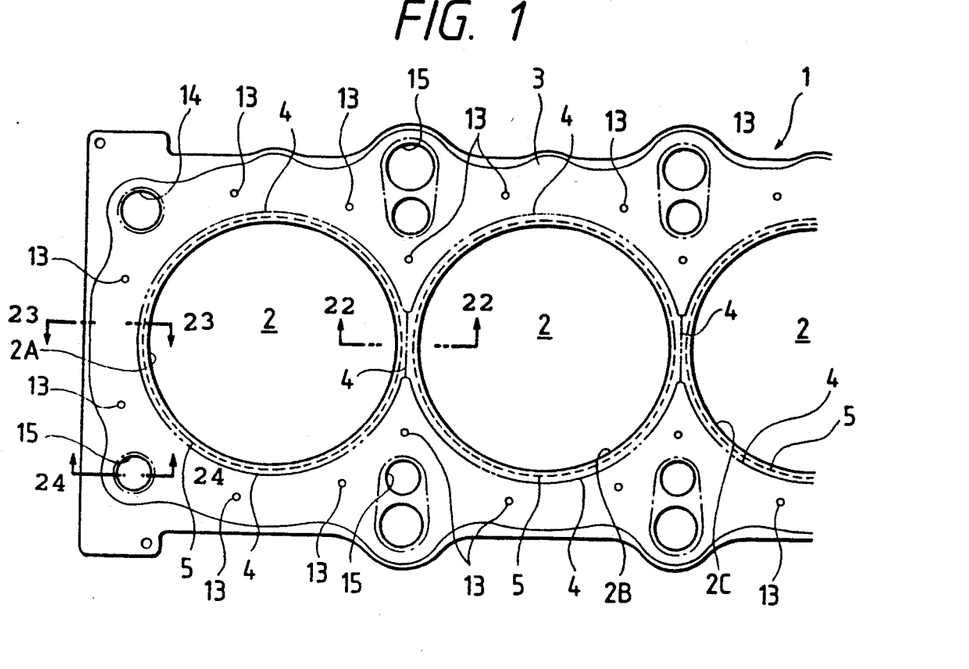
FIG. 1 is a partial plan of an embodiment of the metallic gasket according to the present invention.

A metallic gasket 1 shown in FIG. 1 used to seal the opposed joint surfaces of a cylinder block and a cylinder head fixed thereto in a multicylinder engine. The metallic gasket 1 consists of a single elastic metallic plate 3, which is formed out of a metallic material, for example, SUS630 or SUS631 to be precipitation hardened, SUS304, SUS301 or a SK material (SK1-7) to be nitrided, SUS20J$_2$ or SUS440A to be quenched and tempered, or a titanium alloy or an aluminum alloy to be solid solution heat treated, to a thickness of, for example, 0.2–0.25 mm (0.25 mm in the illustrated embodiment). The hardness of the raw material not yet subjected to the formation of beads is, for example, not more than Hv 200.

The concrete examples of the hardness of these metallic materials determined after they have been subjected to various kinds of heat treatment are as follows. The hardness of SUS304 and SUS301 not yet nitrided is not more than Hv 200 (surface only), and that of the same material nitrided not less than Hv 500, the hardness of a SK material (SK1-7) not yet nitrided being not more than Hv 200, the hardness of the same materials nitrided being not less than Hv 500. The hardness of SUS630 and SUS631 not yet precipitation hardened is not more than Hv 200, and that of the same materials precipitation hardened not less than Hv 350. The hardness of SUS420J$_2$ and SUS440A not yet quenched and tempered is not more than Hv 200, and that of the same materials quenched and tempered not less than Hv 350. The hardness of a titanium alloy and an aluminum alloy (6A1-2Sn-4Zr-6Mo) not yet solid solution heat treated is not more than Hv 200, and that of the same materials solid solution heat treated not less than Hv 350.

Figure 2:
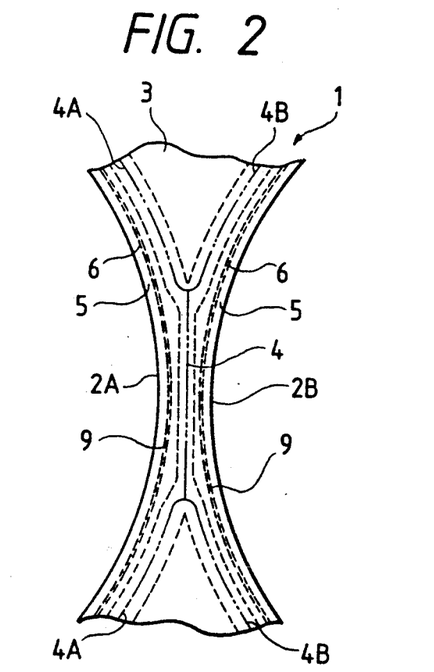
FIG. 2 is an enlarged plan showing a region between adjacent holes for combustion chamber.

Referring to FIG. 2, the left and right solid lines are curves showing parts of holes 2A, 2B for combustion chamber, the thick chain lines on the inner side of these solid lines curves indicating the edges 6 of folded portions, the thin chain lines, which are drawn on the immediate inner side of the thick chain lines curves indicating the limits 9 of reduction of thickness f an elastic metallic plate, a one-dot chain line a line indicating a boundary between two adjacent beads 4, and short thin chain lines on both sides of this one-dot chain line boundary lines determining both edges of the beads 4.

An elastic metallic plate 3 constituting the metallic gasket 1 is provided with holes 2A, 2B, 2C (which will hereinafter be referred to simply as holes and generally designated by a reference numeral 2) for combustion chamber the number of which corresponds to that of cylinders in a multi-cylinder engine. This elastic metallic plate 3 of the metallic gasket 1 is further provided with a plurality each of cooling water passing holes 13, knock holes 14, bolt holes 15, oil passing holes and oil returning holes.

The upper and lower surfaces of the metallic gasket 1 are coated (not shown) with a non-metallic material, such as heat and oil resisting fluoro-rubber or resin to a thickness of, for example, around 10–50 μm, whereby it becomes possible to avoid the metal-to-metal contact between the gasket and a cylinder head and a cylinder block, and secure high corrosion resistance, durability and strength of the gasket. Even when the machines surfaces of the metallic gasket 1 and the machined opposed joint surfaces of the cylinder head and cylinder block are uneven, this non-metallic material covers the uneven surfaces, so that the gasket fulfills it sealing function satisfactorily.

Figure 3:
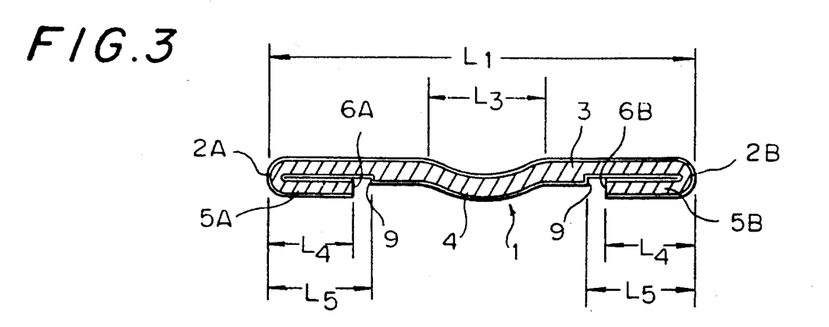
FIG. 3 is a sectional view taken along the line 22—22 in FIG. 1.
Figure 4:
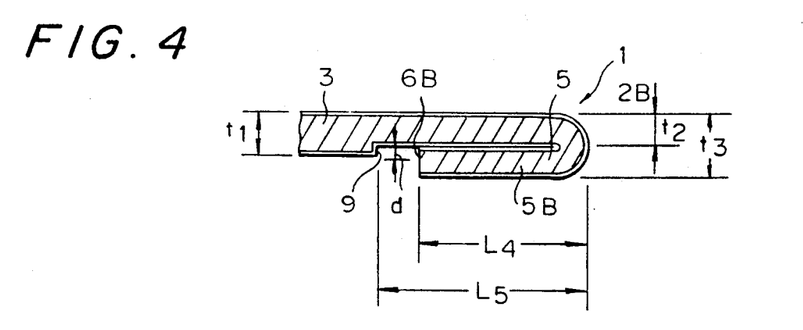
FIG. 4 is an enlarged view of a folded portion, a part of what is shown in FIG. 3.
Figure 5:
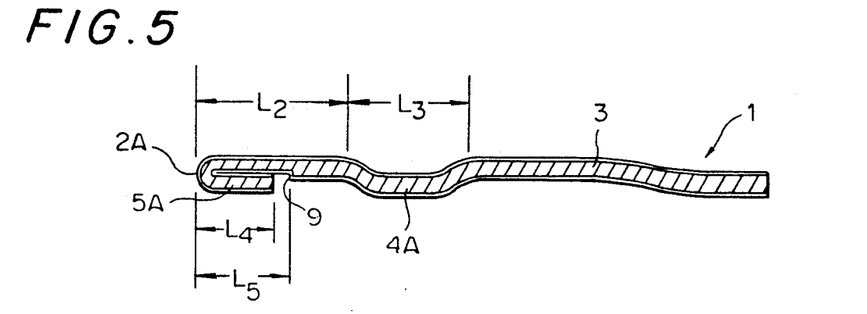
FIG. 5 is a sectional view taken along the line 23—23 in FIG. 1.
Figure 6:
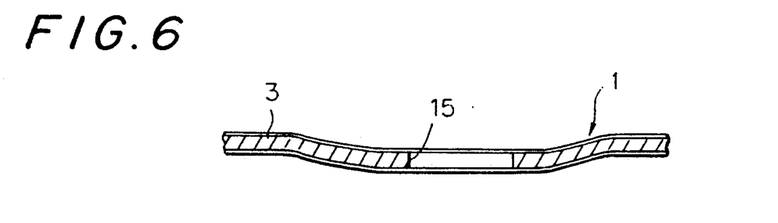
FIG. 6 is a sectional view taken along the line 24—24 in FIG. 1.

FIG. 3 is a sectional view of a boundary portion between adjacent holes 2A, 2B for combustion chamber which are formed in the elastic metallic plate 3, which sectional view is taken along the line connecting the centers of the holes 2A, 2B, i.e. a sectional view of the portion of the metallic plate which is between two adjacent holes 2. The other boundary portions between two adjacent holes 2 have the same cross-sectional construction. FIG. 5 shows a cross section of the metallic gasket 1 taken along the line connecting the hole 2A and an end portion, i.e. an edge portion of the metallic gasket 1. The portion of the metallic plate which is between a hole 2D for combustion chamber, which is positioned on the opposite side of the hole 2A, and the corresponding edge portion of the metallic plate also has the same cross-sectional construction. Besides these portions of the metallic plate, the portions thereof which are around the holes 2 and other than the portions between the holes 2 also have the same cross-sectional construction. FIG. 6 is a sectional view of a portion taken across a bolt hole 15 through which a bolt for tightening the gasket between the opposed joint surfaces f cylinder head and cylinder block is passed. The remaining water holes, oil passing holes, oil returning holes, knock holes and rivet holes also have the same cross-sectional construction.

As may be understood from these drawings, a cross-sectionally mountain-shaped bead 4 (which is generally designated by a reference numeral 4) is provided on the portion of the elastic metallic plate 3 of the metallic gasket 1 which is close to the hole 2 formed therein, so as to extend concentrically with the hole 2 and surround the hole 2 annularly. One surface formed along the hole 2 of the bead 4 projects, and the other surface thereof recesses, whereby a seal is formed. The examples of sizes of the illustrated metallic gasket are as follows. The bead 4 starts in a position which is a distance $L_2$ (for example, about 2.5 mm) away from the inner circumferential edge of the hole 2, and a predetermined radial width $L_3$ of the part of the bead 4 which is between two adjacent holes 2 about 2 mm, a predetermined radial width $L_3$ of the other parts thereof being about 2.5 mm. The parts of the bead 4 which are other than the parts thereof between adjacent holes 2 have a width of 5 mm, and the upper surface of the projecting portion of the bead is formed substantially flat. Although this causes a spring constant of the bead to slightly decrease, the contact between the bead and the opposed joint surfaces of a cylinder head and a cylinder block is stabilized. The height H of the bead 4 is around 0.25 mm which is equal to the thickness of the elastic metallic plate 3. The diameter of the hole 2 is 87 mm, and a distance $L_1$ between adjacent holes 2, for example, about 6.0 mm. As may be noted from FIG. 2, the bead 4A around the hole 2A and the bead 4B around the adjacent hole 2B overlap each other in a region in which the holes 2A, 2B are closest to each other.

Namely, the beads 4 meet each other in the region between the holes 2 to be united into one bead 4. In the joint portion of the beads, the distance between the holes 2 and the bead 4 becomes gradually smaller, while the width of the bead becomes smaller as mentioned above. In the case where the distance between the holes 2 can be set to a sufficiently high level, the beads may not be overlapped; they may be arranged with a narrow clearance left therebetween.

As shown in FIG. 6, the portion of the metallic gasket 1 which is around a bolt hole 15 is cross-sectionally formed so that the portion of the base plate which concentrically surrounds the bolt hole 15 is recessed in the shape of a pit (or mountain) from the other flat portion thereof, whereby a high sealability can be obtained at the portion of the base plate which surrounds the bolt hole 15. Since the cross-sectional shape of the other holes formed in the metallic gasket 1 is substantially identical, a detailed description thereof will be omitted.

Around the holes 2 made in the elastic metallic plate 3, folded portions 5A, 5B are formed on the portions of the bead-ridge-carrying side of the base plate 3 which are on the radially inner side of the bead 4 so that the folded portions do not overlap the bead (the folded portions are generally designated by a reference numeral 5). The radial width of the folded portion 5, i.e. the width of fold $L_4$ is, for example, about 1.2 mm.

This metallic gasket 1 has the above-described construction, and can be manufactured by carrying out the following steps.

Figure 7:
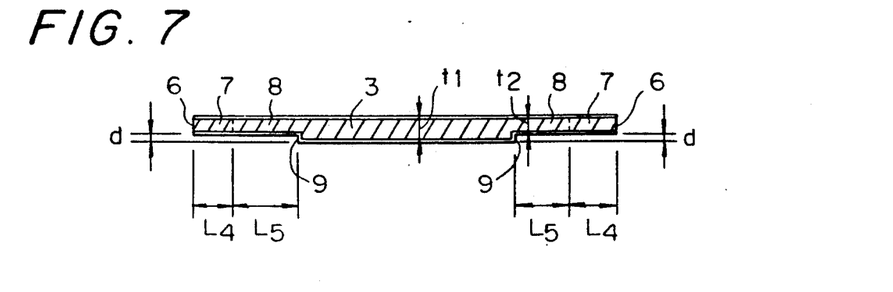
FIG. 7 shows a thickness reduction step, one of the steps of manufacturing this metallic gasket.

First, perforations 6 (which are to form the edges of the folded portions shown in FIG. 1) the radius of which is smaller by a predetermined level than that of predetermined holes 2 for combustion chamber which form the edges of the folded portions 5 after a folding operation has been carried out are formed in the elastic metallic plate 3. The holes 2 and perforations 6 have common centers. Various kinds of holes, such as bolt holes 15 which are other than the holes 2 are then formed. As shown in FIG. 7, the thickness of the annular region which extends from the circumference of the perforation 6 in the radially outward direction to a thickness reduction limit 9, and which has a width at least two times as large as that $L_4$ of the folded portion, is reduced to a level not lower than a half of the thickness $t_1$ of the elastic metallic plate 3. In other words, the folded portion 5 is formed to a predetermined thickness $t_2$ which is between a level not higher than that of the thickness $t_1$ and a level not lower than a half of that thereof. Namely, in the region close to the circumference of the perforation 6 in the elastic metallic plate 3, an annular region of a width, which is equal to the sum of the width $L_4$ of fold and the width $L_5$ (which is, for example, 1.5 mm in the illustrated embodiment) of a region wider than the fold and positioned on the radially outer side thereof, is subjected to a thickness reduction operation so that the thickness of the annular region decreases by a level corresponding to a depth d (which is, for example, 0.06 mm in the illustrated embodiment) to become $t_2$ ($=t_1-d$, for example, 0.19 mm in the illustrated embodiment). The reduction of thickness of the elastic metallic plate 3 may be carried out by any methods including press molding, etching and cutting. When the press molding is employed, the portion of an elastic metallic plate 3 which is around the perforation 6 is crushed, so that the inner diameter of the perforation 6 further decreases. This has to be taken into consideration when the width $L_4$ of fold is determined in the design stage. The pressure molding of this annular region may be done simultaneously with the punching of the perforation.

Figure 8:
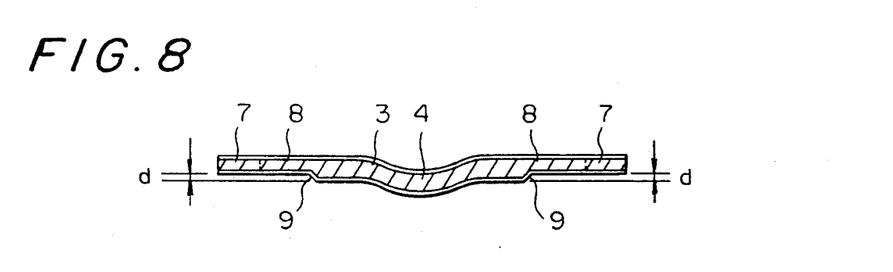
FIG. 8 shows a step of forming a bean of the metallic gasket.

As shown in FIG. 8, a bead 4 is formed on the thickness-reduced region spaced from the circumference of the perforation 6 in the radially outward direction thereof so that the bead 4 extend along the perforation 6. A portion to be folded 7 having a width of fold $L_4$ in the part of the base plate which is around the perforation 6 is then bent in the radially outward direction onto the surface of the base plate from which the bead 4 projects, so as to be laminated on a thickness-reduced portion 8. Since the width $L_5$ is set larger than the width of fold $L_4$, the portion to be folded 7 is not laminated on a non-thickness-reduced portion of a thickness $t_1$. When the bending step has been completed, a folded portion 5 the folded edge of which defines a hole 2 for combustion chamber is formed. Finally, the elastic metallic plate 3 with the folded portion 5 formed thereon is heat treated to regulate the hardness thereof and obtain a metallic gasket 1.

After the bending step for forming the folded portion 5 and before the step of heat treating the metallic gasket 1, a compressive force is applied to the folded portion 5 so as to finely deform the folded portion to a preset thickness. A cylinder head has a low rigidity as compared with a cylinder block, and the largest flexure due to load fluctuation during a combustion cycle of explosion and expansion strokes in a multicylinder internal combustion engine is liable to occur in the portion thereof which is between adjacent holes 2. Accordingly, the sealing performance of the metallic gasket is apt to lower most significantly in this portion of an engine. In order to set the sealing performance of the parts of the folded portion 5 which are between the holes 2 superior to that of the parts thereof which are other than the mentioned parts, employing a method of setting the thickness of the parts of the folded portion 5 which are between the holes 2 larger than that of the remaining parts thereof is considered effective. Therefore, the step of applying a compressive force to the parts of the folded portion 5 which are other than the interhole parts thereof so as to deform the same more than the inter-hole parts thereof may be carried out after the step of forming the folded portion 5 has been completed.

Figure 9:
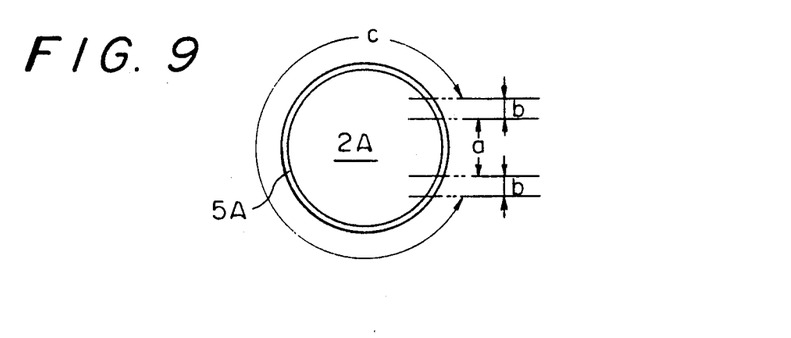
FIG. 9 shows the distribution of thickness of folded portion around one of the holes positioned at both end portions of the metallic gasket.
Figure 10:
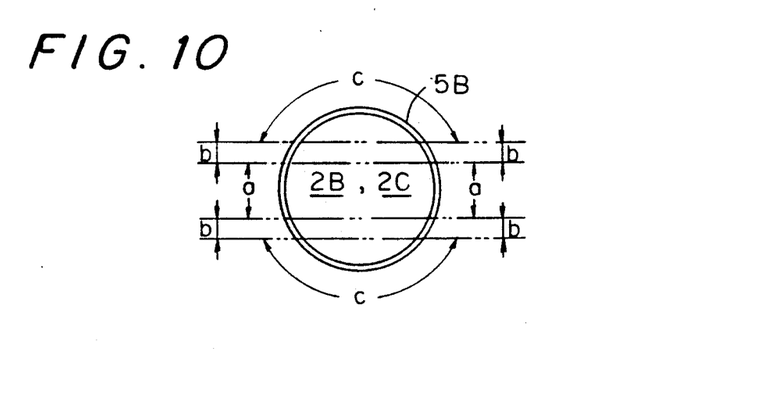
FIG. 10 shows the distribution of thickness of the folded portion around a hole other than the holes positioned at both end portions of the metallic gasket.

Concretely speaking, the folded portion is formed at the part a thereof which is between the holes 2 to a thickness of 0.37 mm, at the parts b thereof which extend on both sides of the part a to a gradually decreasing thickness, and at the arcuate part which extend on both sides of the parts b to a thickness of, for example, 0.32 mm as shown in FIGS. 9 and 10. The elastic metallic plate 3 on which the folded portion 5 has been formed is heat treated so as to regulate the hardness thereof so that the hardness of not more than Hv 200 of the metallic plate not yet subjected to the formation of beads is changed after the completion of the heat treatment to a level according to the kind of the material out of which the metallic plate is formed.

When the metallic gasket 1 is inserted between a cylinder head and a cylinder block and tightened with, for example, bolts passed through the bolt holes 15, to be put in a pressed state, the beads 4 provided near the circumferences of the holes 2 in the elastic metallic plate 3 contact one opposed joint surface to form annular seals. Each folded portion 5 forms another annular seal on the portion of the base plate which is on the radially inner side of the annular seal of the bead 4, against the other opposed joint surface. Owing to these two-stage annular seals, the leakage of the high-temperature high-pressure combustion gas from the holes 2 onto these opposed joint surfaces can be prevented.

Even when irregularity occurs on the opposed joint surfaces of a cylinder head and a cylinder block during the tightening of these structural members, the folded portions 5 and beads 4 are deformed correspondingly, the irregular clearance between the joint surfaces is offset owing to the synergetic effect of the above-mentioned increased number of annular seals and the irregular clearance offsetting actions thereof. Owing to such an increase in the number of annular seals and the actions of the seals of offsetting the irregularity of the mentioned opposed joint surfaces, the amount of flexure, which occurs due to the repetition of the explosion and expansion strokes in a combustion cycle of the engine, is minimized. Since the folded portions 5 in addition to the beads 4 also contact the opposed joint surfaces, the beads 4 and folded portions 5 share the load of tightening force. The thickness of the folded portions 5 is reduced to a satisfactory level. Therefore, even when the above-mentioned minimized repeated stress is exerted on the metallic gasket 1 due to the fluctuation of load during an operation of the engine, a burden is not imposed on the folded portions 5 only, so that the load stress occurring in the beads 4 and folded portions 5 is lightened. This can prevent the occurrence of permanent set in fatigue of the beads and cracks in the seals.

What is claimed is:

1. In a metallic gasket having an elastic metallic plate formed out of an elastic metallic material, said elastic metallic plate having a first lower surface and a second upper surface and being provided with holes for a combustion chamber, and beads constituting seals formed along said holes so as to have convexities to a given height along said first surface and concavities in said second surface thereof, an improvement wherein said elastic metallic plate has folded portions formed by bending parts of said metallic plate which surround said holes onto said first surface thereof which carries said convexities of said beads so as to define said holes, said folded portions being formed to a thickness smaller than said height of said beads, said folded portions and parts of said metallic plate on which said folded portions are laminated being formed to a prior-to-folding thickness in the range of less than the thickness of said metallic plate to not less than that of a half of the thickness of said metallic plate.

2. A metallic gasket according to claim 1, wherein said folded portions are formed to a larger thickness at parts thereof which extend between said holes, and to a smaller thickness at the other parts thereof.

3. A metallic gasket according to claim 1, wherein both surfaces of said elastic metallic plate are coated with a heat and oil resisting non-metallic material.

* * * * *